G. W. BILLINGS.
Drying Box.

No. 40,236. Patented Oct. 13, 1863.

Witnesses.
Inventor.
Geo. W. Billings.

UNITED STATES PATENT OFFICE.

GEORGE W. BILLINGS, OF NEW YORK, N. Y.

IMPROVED METHOD OF DRYING FLAX AND HEMP.

Specification forming part of Letters Patent No. 40,236, dated October 13, 1863; antedated September 28, 1863.

*To all whom it may concern:*

Be it known that I, GEO. W. BILLINGS, of the city, county, and State of New York, have invented a new and useful Mode of Drying Flax and Hemp; and I do hereby declare that the following is a full and exact description thereof, reference being had to the accompanying drawings, and to the letters of reference marked thereon, making a part of this specification.

The nature of my invention consists in a process of drying flax and hemp in the bundle as wetted, and, while yet damp or frozen, by using hot air under pressure with occasional intervals to permit the escape of vapor during the drying process.

I construct a frame of wood or iron of sufficient strength to sustain a pressure of ten pounds to the square inch. For drying flax the frame should be six feet long, six feet high, and two feet eight inches wide. This frame is lined with plank and iron, or it is covered inside with iron alone, the thickness of the iron to be about No. 14 wire-gage.

Figure 1:
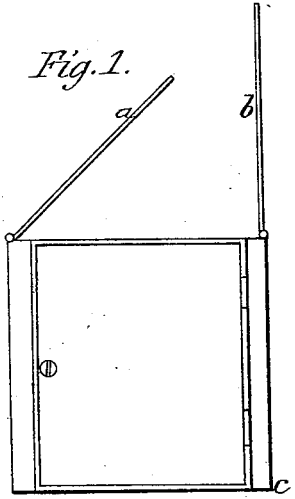
Figure 2:
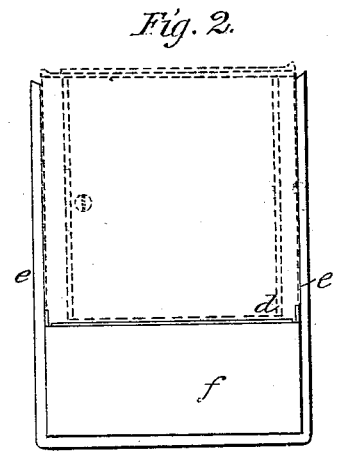

Figure 1 is the end view. Fig. 2 is also the end view showing how the hot-air box is attached. $e\ e$ is the frame to hold the box together.

Figure 3:
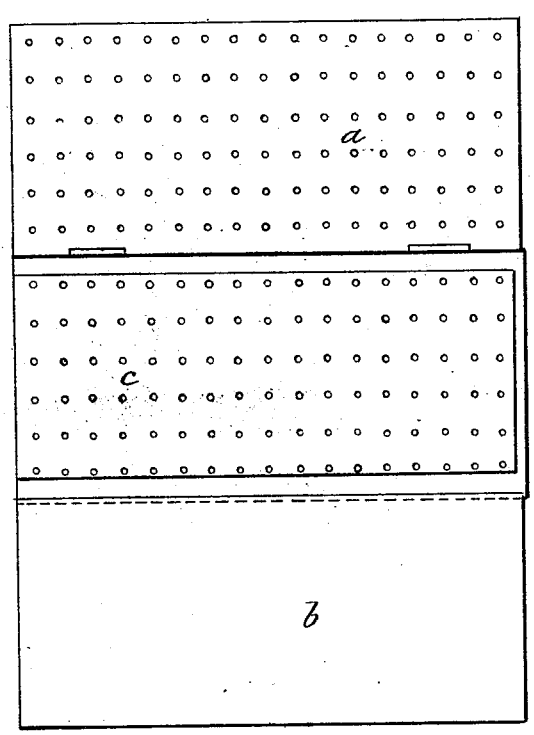

Fig. 3 is the top view of the box having two lids, $a$ and $b$, one perforated and one not perforated. These lids are fastened to the sides of the box. Fig. 3 also shows a perforated plate over the hot-air box, and forming the bottom $c$, as shown in Fig. 1. The material to be dried rests on this plate.

Figure 4:
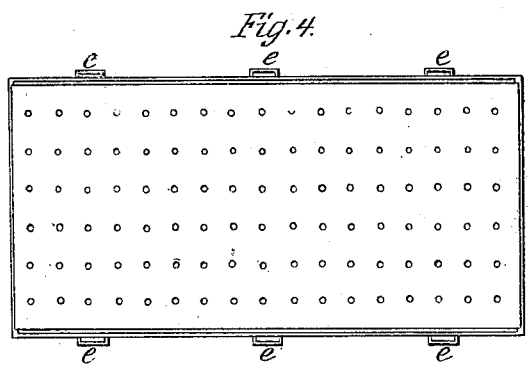

Fig. 4 is the perforated plate over the hot-air box $f$, as shown in Fig. 2.

In Fig. 4, $e\ e\ e\ e\ e\ e$ show the frame as in Fig. 2. The hot-air box is six feet long, two feet high, and two feet eight inches wide. The air is forced into this box by a piston, bellows, or any other suitable method. The air may be heated before being forced into, or when in the box by steam or water pipes laid in proper form inside the box. I place on the top of this box a movable plate having holes or perforations over its whole surface, as shown in Fig. 4. This plate is closely fitted to the plate $c$, which is similarly perforated, and by moving it sidewise about one-fourth of an inch it opens and closes the apertures in the plate $c$ above it. The pressure in this box by the hot air should be from one to six pounds to the square inch, and the temperature not less than 100° Fahrenheit, and should not exceed 160°. The drying or top box is in the same frame as the hot-air box, both forming one structure. At one end of the top box is a door to admit the material to be dried. This door is two feet wide and of the height of the sides of the box. The top lids, $a$ and $b$, are fastened down by side clasps or catch-springs, or they may be fastened by levers passing over the top of the lids and through the posts in the frame, or by any other suitable method. The material is placed in this box with the root end down, resting on the perforated plate $c$ in Figs. 1 and 4. When the box is filled with flax or hemp, the end door is tightly closed, the top lids, $a$ and $b$, are also closed, the perforated plate is moved, and the hot air admitted into the top box. If the material has much moisture to be evaporated, the top lid $a$ should be opened at intervals (once in ten minutes) to allow the vapor to escape. The perforated lid $b$ prevents the material from being thrown out over the side of the top box by the pressure from below, and also allows the vapor to escape while under pressure. If there is but a small amount of moisture to evaporate, the lids $a$ and $b$ are left open to allow the hot air to pass up through the material at will.

The machine for drying hemp should be nine feet high, six feet long, and three feet wide. The hot-air box should be two feet high, three feet wide, and six feet long, the temperature the same as in flax.

A box filled with flax or hemp, wet and frozen, can be thoroughly dried, ready for breaking, in one hour by the above-described process.

What I claim, and desire to secure by Letters Patent, is—

The drying of flax and hemp in the bundle in an inclosed chamber by means of hot air under pressure, and in such manner that the vapor may be permitted to escape at proper intervals during the drying process, substantially as described and set forth.

GEO. W. BILLINGS.

Witnesses:
JOHN S. HOLLINGSHEAD,
C. H. WALKER.